(12) United States Patent
Oh

(10) Patent No.: US 8,604,121 B2
(45) Date of Patent: Dec. 10, 2013

(54) MOLECULAR MISCIBLE BLEND SOLUTION OF AROMATIC POLYAMIDE AND NON-CRYSTALLINE POLYMER, METHOD FOR PREPARING THE SAME, AROMATIC POLYAMIDE BLEND FIBER USING THE SAME AND METHOD FOR DYING THE SAME

(75) Inventor: Tae-Jin Oh, Daegu (KR)

(73) Assignee: Kyungpook National University Industry-Academic Cooperation Foundation (KR)

( * ) Notice: Subject to any disclaimer, the term of this patent is extended or adjusted under 35 U.S.C. 154(b) by 172 days.

(21) Appl. No.: 13/264,200

(22) PCT Filed: Oct. 15, 2009

(86) PCT No.: PCT/KR2009/005929
§ 371 (c)(1),
(2), (4) Date: Oct. 13, 2011

(87) PCT Pub. No.: WO2010/120020
PCT Pub. Date: Oct. 21, 2010

(65) Prior Publication Data
US 2012/0041100 A1    Feb. 16, 2012

(30) Foreign Application Priority Data

Apr. 16, 2009  (KR) .................. 10-2009-0033319

(51) Int. Cl.
*C08L 77/00*    (2006.01)
(52) U.S. Cl.
USPC .......................................... 524/514; 523/351
(58) Field of Classification Search
USPC .......................................... 523/351; 524/514
See application file for complete search history.

(56) References Cited

U.S. PATENT DOCUMENTS

| | | |
|---|---|---|
| 5,073,440 A | 12/1991 | Lee |
| 5,416,164 A | 5/1995 | Lee |
| 5,523,034 A | 6/1996 | Lee |
| 5,728,799 A | 3/1998 | Oh |

FOREIGN PATENT DOCUMENTS

KR    10-1997-0007489    5/1999

OTHER PUBLICATIONS

Tae-Jin Oh, et al., "Molecular Miscible Blend of Poly(2-Cyano-1,4-Phenyleneterephthalamide) and Polyvinylpyrrolidone Characterized by Two-Dimensional Correlation FTIR and Solid State 13C NMR Spectroscopy," Vibrational Spectroscopy, 2008, pp. 1-7.
International Search Report—PCT/KR2009/005929 dated May 29, 2010.

*Primary Examiner* — Edward Cain
(74) *Attorney, Agent, or Firm* — Cantor Colburn LLP

(57) ABSTRACT

Disclosed are a molecular miscible blend solution of aromatic polyamide which is composed of a homogeneous mixture of a highly crystalline para-aromatic polyamide polymer and a non-crystalline polymer and is optically anisotropic, a method for preparing the same, an aromatic polyamide blend fiber prepared from the same and a method for dyeing the fiber at room pressure. Disclosed is a molecular miscible blend solution of aromatic polyamide and a non-crystalline polymer, in which an aromatic polyamide polymer having repeat units represented by the following Formula (I) and polyvinylpyrrolidone at an amount of 5 to 100% of the weight of the aromatic polyamide are dissolved in a polar organic solvent containing an inorganic salt.

[—NH—R—NH—CO—R'—CO—]$_n$    (I)

15 Claims, 4 Drawing Sheets

MOLECULAR MISCIBLE BLEND SOLUTION OF AROMATIC POLYAMIDE AND NON-CRYSTALLINE POLYMER, METHOD FOR PREPARING THE SAME, AROMATIC POLYAMIDE BLEND FIBER USING THE SAME AND METHOD FOR DYING THE SAME

TECHNICAL FIELD

The present invention relates to a molecular miscible blend solution of aromatic polyamide and a non-crystalline polymer, a method for preparing the same, an aromatic polyamide blend fiber prepared from the same and a method for dyeing the fiber. More specifically, the present invention relates to a molecular miscible blend solution of an aromatic polyamide in which a highly crystalline para-aromatic polyamide polymer and a non-crystalline polymer are homogeneously mixed on a molecular scale and the molecular miscible blend solution is optically anisotropic, a method for preparing the same, an aromatic polyamide blend fiber prepared from the same and a method for dyeing the fiber at atmospheric pressure.

BACKGROUND ART

A poly(p-phenylene terephthalamide) fiber (PPTA), an aromatic polyamide fiber which is well-known as Kevlar®available from Du Pont exhibits superior thermal properties and high tensile strength and elastic modulus. These properties are caused by chain stiffness, a high degree of molecular orientation and crystallinity. This fiber is prepared by dry-jet wet spinning a liquid crystalline solution of PPTA in hot 100% sulfuric acid. However, this fiber is readily not dyed and has also a disadvantage of poor adhesion strength due to disadvantages of low compression strength, poor hydrophilicity and high crystallinity.

In an attempt to solve these disadvantages, U.S. Pat. No. 5,073,440 discloses a method in which PPTA and polyvinyl pyrrolidone (PVP) which is a water-soluble polymer are dissolved in 100% sulfuric acid to blend PPTA with PVP, to improve functions such as dyeability, adhesion and hydrophilicity without causing deterioration in mechanical properties. However, Simonutti, et al., investigated miscibility of polymer blends prepared from a PPTA/PVP solution in 100% sulfuric acid by cross-polarization/magic angle spinning solid state $^{13}$C NMR spectroscopy. As a result, it can be found that these blends were not homogeneously mixed on a molecular scale, but phase-separated on a scale of a few nanometers, i.e., a nanocomposite (Macromolecules, vol 35, p3563, 2002). That is, according to the technique, crystalline PPTA and non-crystalline PVP polymers are not mixed on a molecular scale, but form a phase-separated nanocomposite. For this reason, composite fibers are non-uniform through heterogeneous mixing, which may disadvantageously cause non-uniform treatment or leveling property defects during dyeing.

In addition, the technique uses strong inorganic acid such as 100% sulfuric acid, thus having several problems such as environmental problems and problems associated with preparation processes. Disadvantageously, sulfuric acid, which is not completely removed in the washing process, may cause problems associated with heterogeneous treatment when applied to functional fibers.

Accordingly, preparation of a molecular miscible blend of crystalline aromatic polyamide and a non-crystalline polymer, a method for uniformly dyeing aromatic polyamide fibers at room pressure, and a method associated with preparation of highly functional aromatic polyamide fibers which may be uniformly dyed have not been suggested to date.

DISCLOSURE

Technical Problem

Therefore, the present invention has been made in view of the problems and it is one object of the present invention to provide a molecular miscible blend solution of aromatic polyamide and a non-crystalline polymer which has inherent heat resistance and superior mechanical properties of aromatic polyamide and solves problems such as dyeability or adhesion defects due to low compression strength and low hydrophilicity, disadvantages thereof, a highly functional aromatic polyamide fiber prepared therefrom and a method for dyeing the fiber.

It is another object of the present invention to provide methods for preparing a molecular miscible blend solution of aromatic polyamide and a non-crystalline polymer, and a highly functional aromatic polyamide fiber by a simple process.

Technical Solution

Accordingly, in accordance with one aspect of the present invention, provided is a molecular miscible blend solution of aromatic polyamide and a non-crystalline polymer, in which an aromatic polyamide polymer and polyvinylpyrrolidone at an amount of 5 to 100% of the weight of the aromatic polyamide are dissolved in a polar organic solvent containing an inorganic salt, wherein the aromatic polyamide polymer has at least 25 mol % of repeat units represented by the following Formula (I) to the whole repeat units of the aromatic polyamide polymer and the numbers of repeat units in each aromatic polyamide is 10 to 100,000:

wherein R is an aromatic group having at least one nitrile group substituted on the aromatic nucleus; and R' is a phenyl, naphthyl or diphenyl group, each of which is substituted or not substituted by Cl, Br, I, NO$_2$, an alkyl group having 1 to 4 carbon atoms, or an alkoxy group having 1 to 4 carbon atoms.

In addition, in Formula (I), R is selected from the group consisting of compounds represented by the following Formulae:

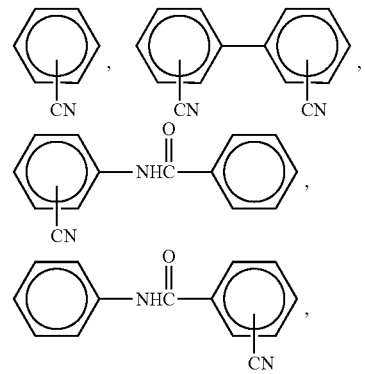

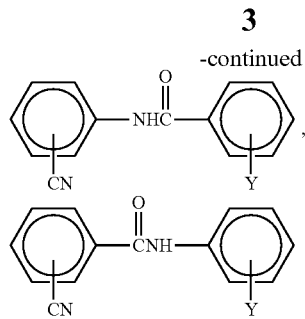

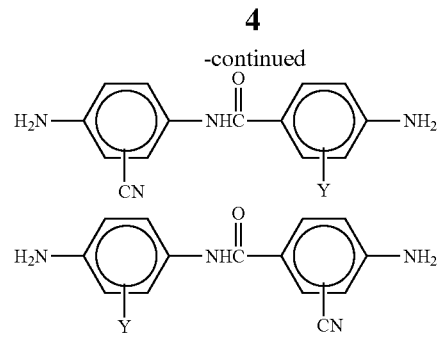

wherein Y represents Cl, Br, I, NO$_2$, an alkyl group having 1 to 4 carbon atoms, or an alkoxy group having 1 to 4 carbon atoms. The same is applied to below.

In the configuration of the present invention, examples of the polar organic solvent used for dissolving the aromatic polyamide and polyvinylpyrrolidone include amide-based organic solvents, urea-based organic solvents and mixtures thereof. Of these, N-methyl-2-pyrrolidone (NMP), N,N-dimethyl acetamide (DMAc), hexamethylphosphoramide (HMPA), N,N,N',N'-tetramethyl urea (TMU), N,N-dimethyl formamide (DMF), dimethylsulfoxide (DMSO) or a mixture thereof is preferred.

Examples of the inorganic salt include halogenated alkali metal salts and halogenated alkaline earth metal salts such as CaCl$_2$, LiCl, NaCl, KCl, LiBr, and KBr. The inorganic salt may be added alone or as a mixture of two or more types and the amount thereof is preferably 12% or less, based on the weight of the polar organic solvent. Although the content exceeds 12% or more, the intended effects are not further increased and the content is thus not economically preferred.

The aromatic polyamide is prepared by solution polycondensation of an aromatic diamine which has or does not have a nitrile group substituted in an aromatic nucleus, in which 25% or more thereof has a nitrile group substituted in an aromatic nucleus and an aromatic diacid halide containing an aromatic nucleus represented by R'.

During polycondensation, a polar organic-based solvent such as an amide-based organic solvent, a urea-based organic solvent or a mixture thereof is used as the polymerization solvent.

A representative example of the aromatic diamine in which a nitrile group is substituted in an aromatic nucleus is given as follows, but the component is not limited thereto.

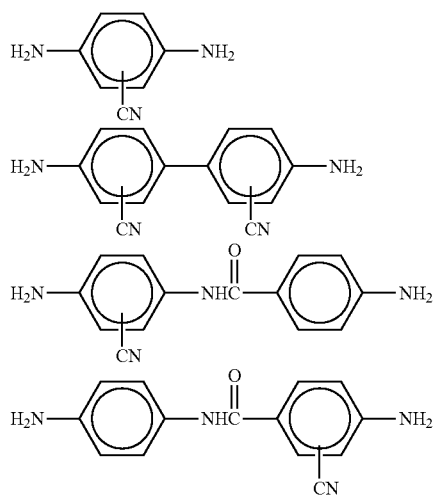

Representative examples of aromatic diacid halides that can be used for the preparation of the aromatic polyamide polymer of the present invention include terephthalic acid chloride, isoterephthalic acid chloride, naphthylic acid chloride, diphenylic acid chloride and the like, but the aromatic diacid halide is not limited thereto.

More details of the polymerization of aromatic polyamide can be seen from Korean Patent No. 171,994 and U.S. Pat. No. 5,278,799.

Polyvinylpyrrolidone (PVP) is a water-soluble polymer prepared by polymerization of vinylpyrrolidone, as depicted by the following equation and is soluble in a variety of polar solvents as well as water.

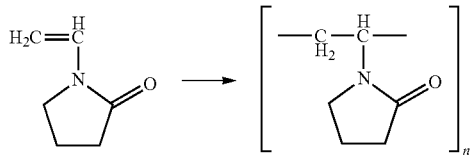

The amount of PVP used is preferably 5 to 100%, with respect to the weight of the aromatic polyamide polymer. When the amount is lower than 5%, the effects of addition are insufficient and when the amount is 100% or more, the physical properties of the aromatic polyamide are disadvantageously deteriorated.

The molecular miscible blend solution of aromatic polyamide and a non-crystalline polymer is an optically anisotropic spinning solution which exhibits a variety of interference colors by double refraction when observed through a polarization microscope. Molecular miscible aromatic polyamide blend articles having a variety of forms such as fibers, films and pulps can be produced from the solution. The molecular miscibility of polyamide blend articles thus prepared can be confirmed by cross-polarization/magic angle spinning solid state $^{13}$C NMR spectroscopy and 2-dimensional correlation FTIR spectroscopy.

Meanwhile, the molecular miscible blend solution of aromatic polyamide and the non-crystalline polymer may be prepared by a method comprising separately dissolving the aromatic polyamide polymer and, non-crystalline polymer, polyvinylpyrrolidone, in a polar organic solution containing an inorganic salt, or a method comprising polymerizing the aromatic polyamide polymer and, at the same time, adding polyvinylpyrrolidone to the polymerization solution, followed by dissolution.

Among these methods, the method comprising adding polyvinylpyrrolidone to the aromatic polyamide polymerization solution, followed by dissolving is preferred in that the process is simple and molecular mixing is easier, and includes the following two methods.

A first method includes:
1) preparing a polymerization solvent including an amide-based organic solvent, a urea-based organic solvent or a mixture thereof;
2) adding PVP to the polymerization solvent, followed by dissolution;

3) dissolving aromatic diamine in the polymerization solvent containing PVP such that aromatic diamine having a nitrile group substituted in an aromatic nucleus is 25% to 100% by mole with respect to the total aromatic diamine;

4) adding aromatic diacid halide to the polymerization solvent while strongly stirring at a temperature of 0 to 50° C.;

5) allowing a gel-form polymer produced in step (4) to stand for 0 to 24 hours; and 6) adding an inorganic alkali compound to the gel-form polymer, following by stirring.

A second method includes:

1) preparing a polymerization solvent including an amide-based organic solvent, a urea-based organic solvent or a mixture thereof;

2) dissolving aromatic diamine in the polymerization solvent such that aromatic diamine having a nitrile group substituted in an aromatic nucleus is 25% to 100% by mole with respect to the total aromatic diamine;

3) adding aromatic diacid halide to the polymerization solvent while strongly stirring at a temperature of 0 to 50° C.;

4) allowing a gel-form polymer prepared in step (3) to stand for 0 to 24 hours; and 5) adding an inorganic alkali compound to the gel-form polymer, followed by stirring, to prepare an aromatic polyamide solution; and 6) adding polyvinylpyrrolidone to the aromatic polyamide solution, followed by dissolution and mixing, during stirring in step (5).

As mentioned above, in the method comprising adding polyvinylpyrrolidone to the polymerization solution of the aromatic polyamide polymer, followed by dissolution, an inorganic alkali compound in the form of carbonate, hydride, hydroxide or oxide of an alkali metal or an alkaline earth metal, or a mixture thereof, such as $Li_2CO_3$, $CaCO_3$, $LiH$, $CaH_2$, $Ca(OH)_2$, $Li_2O$, or $CaO$ may be added, instead of directly adding a halogenated alkali metal salt or halogenated alkaline earth metal salt-type inorganic salt such as $CaCl_2$, LiCl, NaCl, KCl, LiBr or KBr, to remove, by neutralization, halogenated hydrogen produced in the reaction between the aromatic diamine and aromatic diacid halide, and the amount of inorganic alkali compound added is preferably 10 to 200 mole % of a chemical equivalent required for neutralizing hydrogen halide.

The molecular miscible blend fiber of aromatic polyamide according to the present invention is prepared by dry-jet wet-spinning a molecular miscible blend solution of aromatic polyamide and a non-crystalline polymer, and is a molecular miscible aromatic polyamide blend fiber in which aromatic polyamide and polyvinylpyrrolidone are uniformly mixed on a molecular scale.

As mentioned above, the molecular miscibility of fiber can be confirmed by cross-polarization/magic angle spinning solid state $^{13}C$ NMR spectroscopy and 2-dimensional correlation FTIR spectroscopy.

A general aromatic polyamide fiber has a dense structure and dye molecules are thus not readily permeated into fiber molecule structures. Accordingly, it is considerably difficult to dye aromatic polyamide. However, the molecular miscible aromatic polyamide blend fiber according to the present invention can be dyed with a basic dye having positive charges or an acid dye having negative charges at atmospheric pressure, and in particular, the fiber can be dyed at a higher concentration with a basic dye having positive charges.

Meanwhile, the fiber may be dyed in the form of a dry fiber, and the fiber is more preferably dyed in the form of a wet-fiber obtained after dipping in the polar organic solvent or an aqueous solution containing the same and thoroughly washing with water.

When the fiber is dipped in a polar organic solvent or an aqueous solution containing the same, PVP present in the fiber is partially eluted, fine molecular pores are formed in the fiber structure to facilitate dye permeation, and the dye is fixed during drying, thus exhibiting superior washing resistance and being dyed at a high concentration.

Advantageous Effects

The aromatic polyamide fiber exhibits considerably superior thermal and mechanical properties, but has a disadvantage of dyeing impossibility. However, the molecular miscible blend solution of aromatic polyamide and a noncrystalline polymer, and an aromatic polyamide blend fiber prepared therefrom according to the present invention can be dyed with an acid or basic dye at atmospheric pressure, and a novel demand for fibers for clothes and industrial fibers requiring high strength or a variety of colors is expected to be created.

In addition, the method for preparing the molecular miscible blend aromatic polyamide solution according to the present invention is effective in preparing more complete molecular miscible blend solutions by a relatively simple process.

DESCRIPTION OF DRAWINGS

The above and other objects, features and other advantages of the present invention will be more clearly understood from the following detailed description taken in conjunction with the accompanying drawings, in which.

BEST MODE

Figure 1:
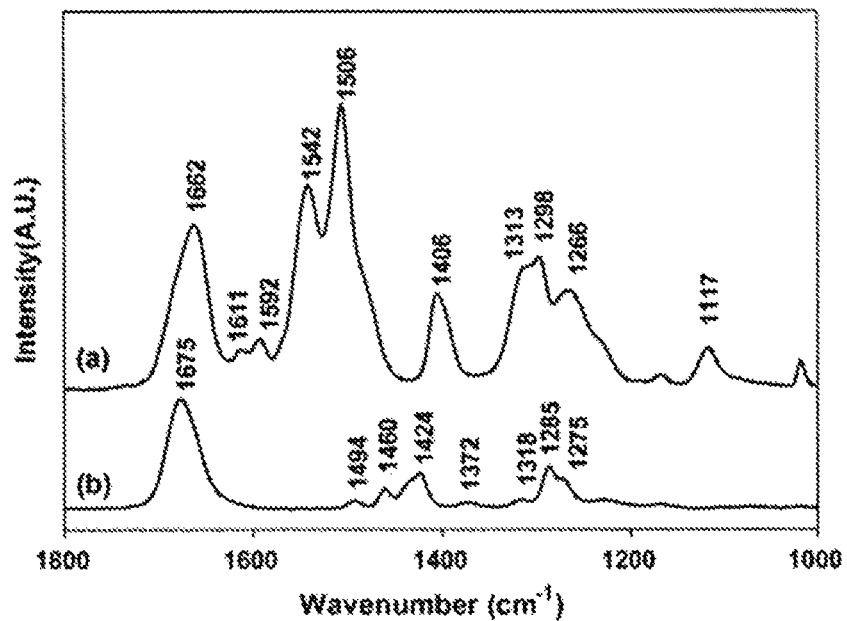
FIG. 1 shows FTIR spectra of homopolymers of CN-PPTA (a) and PVP (b)

Hereinafter, the present invention will be described in more detail with reference to the following preferred examples.

Example 1

Preparation of Molecular Miscible Blend Solution and Aromatic Polyamide Blend Fiber of CN-PPTA/PVP 100 mL of NMP and 8.012 g of PVP (molecular weight of 55,000, available from Fluka Corp.) were added to a 4-necked round bottom flask equipped with mechanical stirrer and nitrogen inlet and outlet, and dissolved. Into this solution was added 8.014 g (0.0609 mol) of 2-cyano-1,4-phenylenediamine (CNPPD), followed by stirring at room temperature until complete dissolution. The solution was cooled to 5° C. in an ice bath, 6.177 g (0.0305 mol) of terephthaloyl chloride (TPC) was further added to the solution, with stirring for 10 minutes, giving rise to an increase of temperature to about 30° C. Then, the solution was cooled to 5° C. again in an ice bath, and 6.177 g (0.0305 mol) of TPC was added thereto with vigorous stirring, leading to a rapid increase of viscosity and finally solidification in a few minutes. An equimolar amount of $Li_2CO_3$ (0.4497 g) was added to the solidified reaction mixture for neutralization of HCl generated during reaction. As a result of continuous stirring for several hours, a molecular miscible blend solution of [poly(2-cyano-1,4-phenylenterephthalamide) [CN-PPTA] and PVP having silver-white luster was obtained and the solution was confirmed to be an optically anisotropic solution which exhibited optical birefringence examined under crossed-polarization optical microscope. In addition, the molecular miscible blend solution caused no phase-separation although allowed to stand for several days.

The molecular miscible blend solution was deaerated at 60° C. and filtered through a 400-mesh stainless steel screen, and aromatic polyamide blend filament fibers were spun by extrusion (spinneret diameter of 0.06 mm) with a draw ratio of 10 through a 10 mm air gap into a distilled water coagulation bath at a temperature of below 10° C.

The spun filament fibers were soaked in distilled water for several days to remove any residual solvent and dried under tension at a temperature of 135° C.

Examples 2 to 6

Dyeing of Aromatic Polyamide Blend Fibers

The aromatic polyamide blend fiber filaments prepared in Example 1 were dipped in DMAc for 24 hours, thoroughly washed with distilled water, and wet-filaments from which excess moisture was removed using absorbent paper were prepared and used as dyeing samples.

0.2 g of Doracryl dye (basic dye, available from M. Dohmen Corp.) and 1.2 mL of glacial acetic acid were added to 100 mL of distilled water, to prepare basic dye solutions of five colors of orange (Example 2), blue (Example 3), yellow (Example 4), green (Example 5), and red (Example 6).

0.5 g of each aromatic polyamide blend fiber filament dyeing sample prepared was added to the basic dye solution, dyed at a temperature of 100° C. for one hour, washed with water and dried under tension at a temperature of 105° C.

The dyed fiber was added to a liquid soap aqueous solution having a concentration of 1 g/L. The dye was not eluted from the fiber although the fiber was treated at 100° C. for one hour.

The dyeability and leveling properties of respective dyed samples of Examples were evaluated in accordance with the following method and the results thus obtained are shown in Table 1.

First, dyeability was evaluated by measuring the value of K/S at a maximum absorbance wavelength of the dyed fiber sample based on a control white panel, at 6 points, and calculating an average. As can be seen from Table 1 above, the K/S values of the dyed samples are 10.2 to 18.3, which are considerably higher than 3.5, the K/S value of a non-dyed fiber sample. This indicates that the dyed material was dyed at a high concentration. The dyed sample, when visually observed, was clear and vivid in color.

Meanwhile, leveling property was evaluated by measuring the values, L, a and b of the dyed sample at a point, and averaging color difference ΔE obtained by comparing the values, L, a and b, measured at other 5 points, based on the value. As can be seen from Table 1, the dyed samples of Examples exhibited a color difference of 1.1 to 2.5, which falls within an acceptable range of the leveling property. Visually, the total filament bundles were uniformly dyed so that color difference in regions of each sample was not seen.

TABLE 1

|   | Dye used | K/S | Maximum absorbance wavelength (nm) | Color difference (ΔE) |
|---|---|---|---|---|
| undyed | — | 3.5 | 400 | — |
| Ex. 2 | Orange R 400% | 16.3 | 490 | 1.1 |
| Ex. 3 | Blue GL 300% | 18.3 | 600-620 | 1.3 |
| Ex. 4 | Yellow XGRL 200% | 13.2 | 460-470 | 1.3 |
| Ex. 5 | Green (mixture) | 14.3 | 440-450 | 1.4 |
| Ex. 6 | Red (mixture) | 10.2 | 540 | 2.5 |

Experiment 1

Confirmation of Molecular Miscibility of CN-PPTA/PVP Molecular Miscible Blend

Preparation of Sample

CN-PPTA used herein was a polymer obtained from 2-cyano-1,4-phenylene diamine (CN-PPD) and terephthaloyl chloride (TPC) in accordance with a method disclosed in U.S. Pat. No. 5,728,799, and PVP used herein was available from Fluka Corp.

Blends of CN-PPTA/PVP were prepared by dissolving mixtures of CN-PPTA/PVP with varying compositions in 5 wt % LiCl/DMAc as solvent at a polymer concentration of 1.6 wt %. From these solutions, films were cast and coagulated in water to remove DMAc and LiCl, and subsequently dried at 100° C. in a vacuum oven. All blend films found to be transparent. Films for FTIR spectroscopy were sufficiently thin to be within the absorbance range where the Beer-Lambert law was obeyed. The composition of blends of CN-PPTA/PVP was analyzed by FTIR spectroscopy with measurement of the absorbance of the characteristic absorption band of CH for PVP at 2,954 $cm^{-2}$, and that of C≡N at 2,232 $cm^{-2}$, together with use of the calibration equation (1) containing the absorbance and weight fraction of PVP and CN-PPTA.

$$\omega PVP = 0.595 FA^2 + 0.409 FA + 0.013 \quad (1)$$

wherein ωPVP is the weight fraction of PVP and is defined as ωPVP=wPVP/(wPVP+wCN-PPTA), wPVP and wCN-PPTA are the weights of PVP and CN-PPTA, respectively. And FA is the absorbance fraction of PVP at 2,954 $cm^{-2}$ and is defined as FA=A 2,954 $cm^{-1}$/(A 2,954 $cm^{-2}$+A 2,232 $cm^{-2}$).

The fiber used for the experiment was prepared by dry jet wet spinning of the lyotropic liquid crystal spinning solution.

The CN-PPTA fiber was prepared as follows. A CN-PPTA polymer anisotropic dope (13 wt %) using 5 wt % LiCl-containing NMP solvent was deaerated at 50° C. and filtered through a 400-mesh stainless steel screen. It was spun at a temperature of 50° C. with a draw ratio of 10 through a 10 cm air gap into a distilled water coagulation bath maintained at 5° C. The mixture was soaked in a large amount of distilled water for several days to remove the residual solvent and dried under tension at 135° C. for one hour to prepare the fiber.

The CN-PPTA/PVP blend fiber used herein was a fiber prepared by a method described in Example 1.

2-Dimensional Correlation FTIR Spectroscopy 2D correlation spectroscopy has been applied as a powerful tool to study interactions in polymer blends, and it is particularly effective in analyzing hydrogen bonding interactions. The composition-dependent FTIR spectra of polymer blends of CN-PPTA/PVP with composition of 92/8, 82/18, 68/32, 49/51, 44/56 and 39/61 wt % were analyzed by 2D FTIR correlation spectroscopy. New bands from being separated overlapped peaks of the blends in the range of 1,700 to 1,600 $cm^{-1}$ of the amide I absorption bands.

Figure 2:
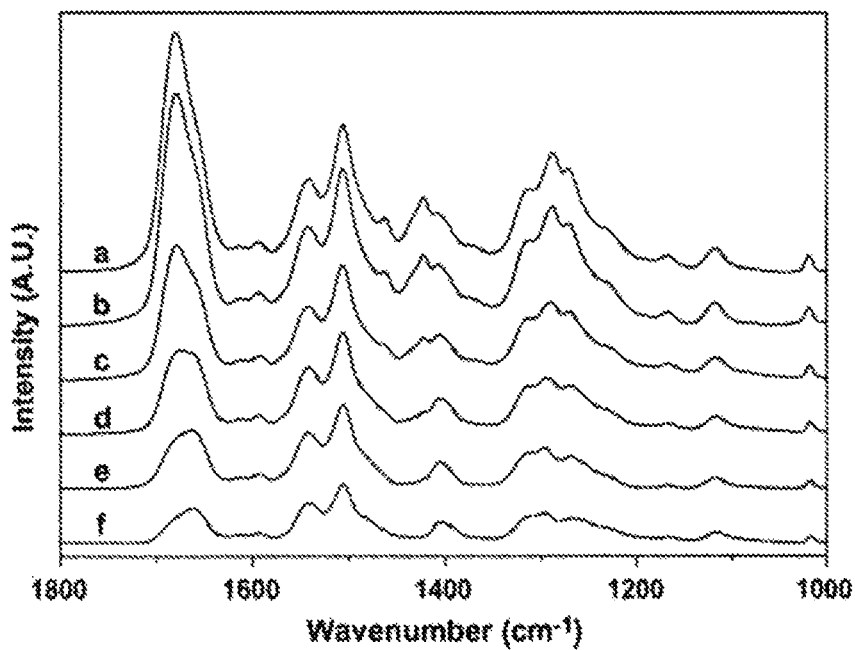
FIG. 2 shows offset FTIR spectrum of CN-PPTA/PVP blends with different compositions.

FIG. 1 shows FTIR spectra of homopolymers of CN-PPTA (a) and PVP(b) with their C═O carbonyl absorption peaks at 1,662 and 1,675 $cm^{-1}$, respectively, and FIG. 2 shows offset FTIR spectra of CN-PPTA/PVP blends with different compositions. The blends of CN-PPTA and PVP with various compositions exhibits broad absorption bands due to overlapping in the range of 1,600 to 1,700 $cm^{-1}$, which prevents identification of newly appearing absorption bands as shown in FIG. 2. In FIG. 2, a, b, c, d, e and f represent CN-PPTA/PVP blends with composition of 39/61, 44/56, 49/51, 68/32, 82/18 and 92/8 wt %, respectively.

Figure 3:
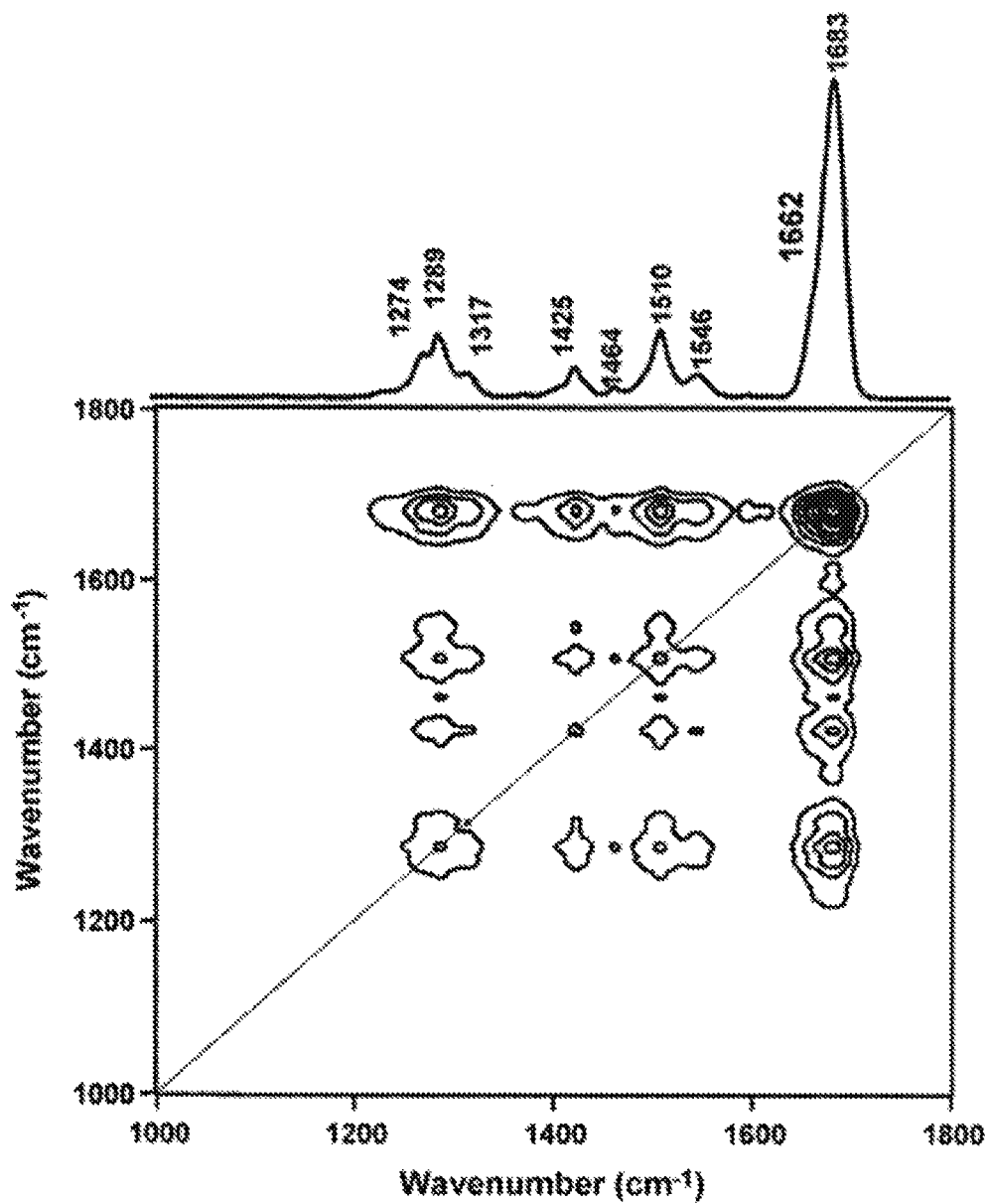
FIGS. 3 and 4 show synchronous 2D correlation spectra and asynchronous 2D correlation spectra at 1,000 to 1,800 $cm^{-1}$ from FTIR spectra shown in FIG. 2.
Figure 4:
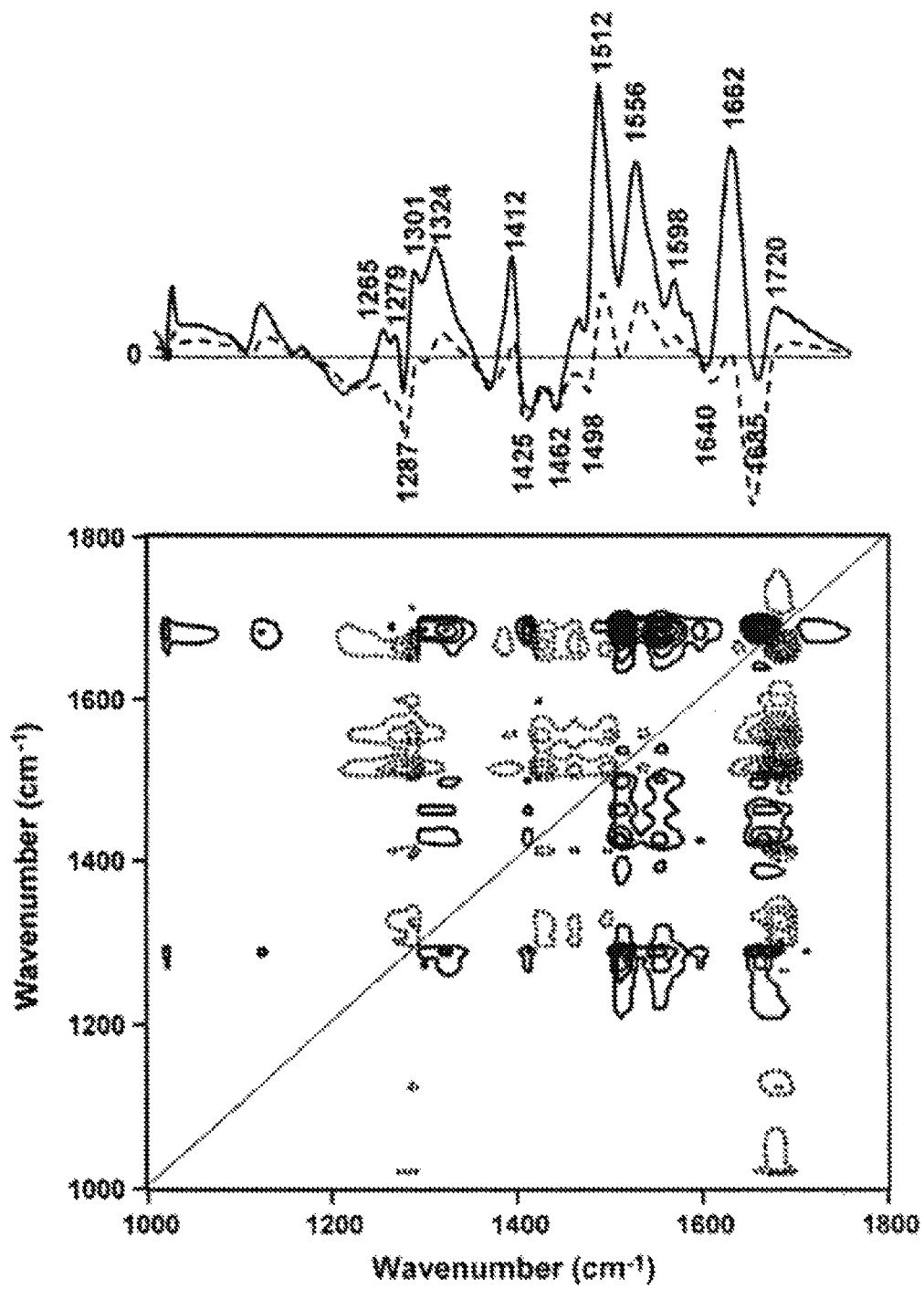

FIG. 3 shows the synchronous 2D correlation spectrum in 1,000 to 1,800 $cm^{-1}$ region generated from the FTIR spectrum shown in FIG. 2. A power spectrum extracted along the diagonal line on the synchronous spectrum is also shown at the top of FIG. 3. In the synchronous 2D correlation spectrum, autopeaks at 1,683 and 1,662 cm$^{-1}$ (shoulder) are observed, indicating that the intensities of these bands most significantly with composition variation. In the synchronous 2D correlation spectrum, substantially all positive cross peaks were observed. This indicates that all band intensities increase with composition variation. The corresponding asynchronous 2D correlation spectrum and the slice spectra at 1,685 and 1,662 cm$^{-1}$ are shown in FIG. 4. Bands near 1,683 cm$^{-1}$ assigned to carbonyl characteristic absorption bands for CN-PPTA were resolved into several bands at 1,720, 1,685, 1,662 and 1,640 cm$^{-1}$ in the asynchronous 2D correlation spectrum. The existence of these bands is not readily detectable in the original 1D spectra. Assignments of homopolymers of CN-PPTA and PVP, and their blends in selected regions of the FTIR spectra are shown in Table 2.

TABLE 2

| Frequency (cm$^{-1}$) | Assignment |
|---|---|
| | Homopolymer |
| 1675 | PVP C=O str. (lactam) free hydrogen-bonded |
| 1662 | CN—PPTA C=O str. (amide I) hydrogen-bonded |
| 1542 | CN—PPTA N—H bend deform (amide II) hydrogen-bonded with CN—PPTA |
| 1506 | CN—PPTA aromatic C=C str. |
| 1424 | PVP C—N str. (lactam) |
| 1406 | CN—PPTA C—N str. (amide III) |
| 1313 | CN—PPTA N—H bending hydrogen-bonded |
| | Blend |
| 1685 | CN—PPTA C=O str. (amide I) free hydrogen-bonded |
| 1640 | PVP C=O str. (lactam) hydrogen-bonded |
| 1556 | CN—PPTA N—H bend deform (amide II) hydrogen-bonded with PVP |
| 1512 | CN—PPTA aromatic C=C str. |
| 1425 | PVP C—N str. (lactam) |

TABLE 2-continued

| Frequency (cm$^{-1}$) | Assignment |
|---|---|
| 1412 | CN—PPTA C—N str. (amide III) |
| 1324 | CN—PPTA N—H bending free hydrogen-bonded |

The carbonyl absorption band of PVP at 1,675 cm$^{-1}$ shifted to a new low frequency absorption band at 1,640 cm$^{-1}$ with a change of 35 cm$^{-1}$ suggesting its strong hydrogen bonding with NH (amide II) proton of CN-PPTA. Another new absorption band at 1,685 cm$^{-1}$ was due to the carbonyl absorption band of CN-PPTA that shifted to a higher frequency than that at 1,662 cm$^{-1}$. This means that some of the carbonyl groups in the CN-PPTA components of the blends were in a free state or in a non-hydrogen bonded state as a result of participation of NH proton of CN-PPTA in hydrogen bonding. Accordingly, it was observed that the absorption bands of NH bend deformation of CN-PPTA at 1,542 cm$^{-1}$ and 1,313 cm$^{-1}$ shifted to higher wavenumbers of 1,556 cm$^{-1}$ and 1,324 cm$^{-1}$, respectively.

Solid State $^{13}$C NMR Spectroscopy

Solid state $^{13}$C NMR spectroscopy has been applied as a powerful tool for investigating miscibility between two polymers. Chemical shifts and line shapes of $^{13}$C NMR spectroscopy are very sensitive to the local environment around a carbon nucleus. Hydrogen bonding strongly influences the electron density around a given carbon comprising interacting functionalities due to an increase or decrease in its electron density. When changes of chemical shifts of $^{13}$C NMR spectra occur for some blends, functionalities of the respective blend components interact sufficiently to produce homogeneous mixing on a molecular scale (ca. 1 nm), mostly via hydrogen bonding.

Figure 5:
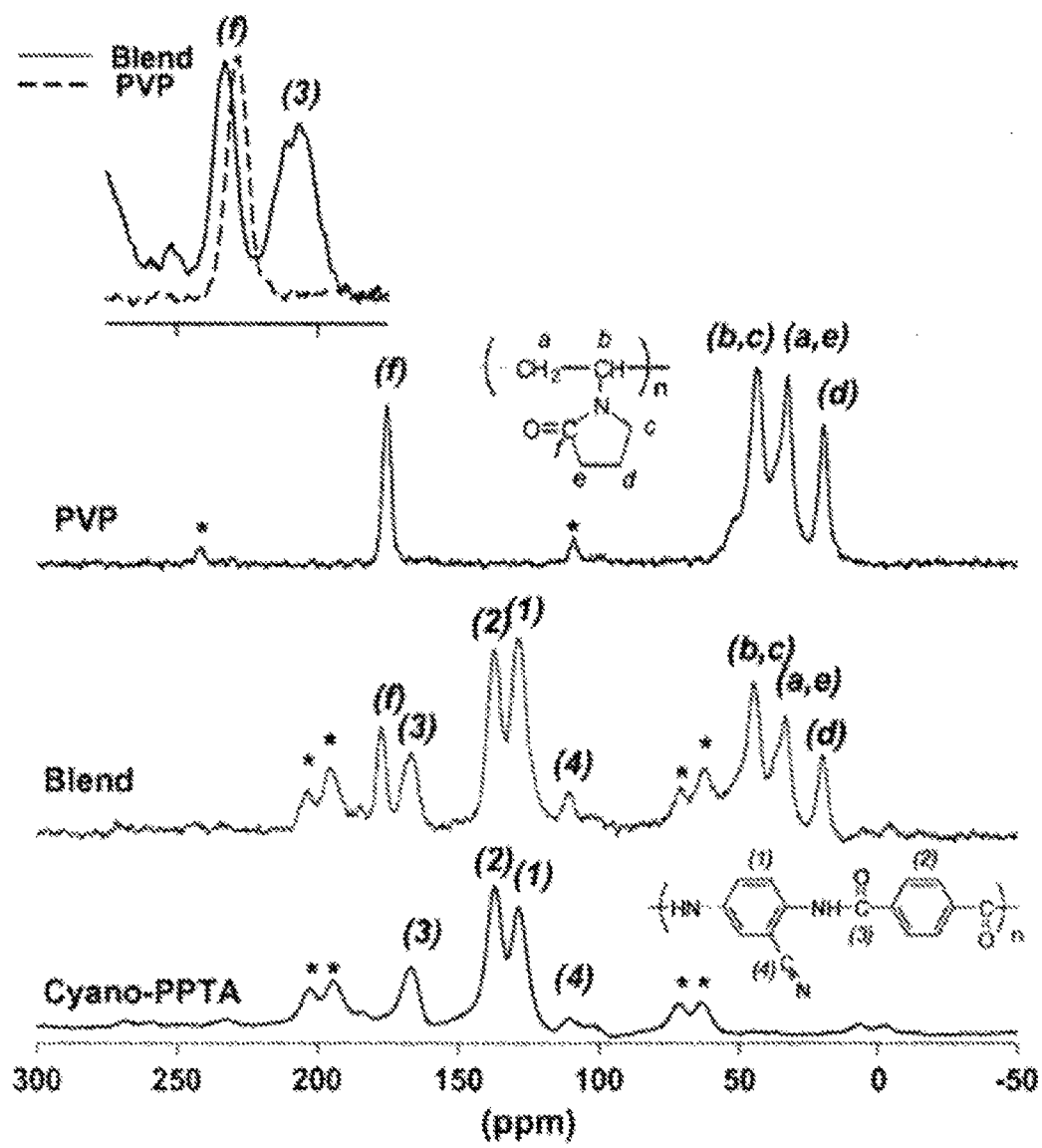
FIG. 5 shows solid state CP/MAS $^{13}C$ NMR spectra of liquid crystalline (LC) higher oriented blend fiber and CN-PPTA/PVP (67/33 wt %) powder.

FIG. 5 and Table 3 show solid state CP/MAS $^{13}$C NMR spectra of liquid crystalline (LC) highly oriented blend fiber and powder of CN-PPTA/PVP (67/33 wt %) as well as LC highly oriented CN-PPTA fiber and PVP powder as references.

TABLE 3

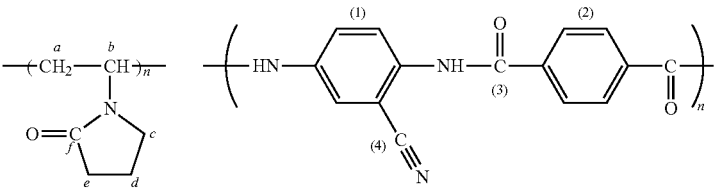

| | PVP component | | | | CN-PPTA component | | | |
|---|---|---|---|---|---|---|---|---|
| | Aliphatics | | C=O | | Aromatics | | C=O | C=N |
| Sample | (d) | (a, e) | (b, c) | (f) | (1) | (2) | (3) | (4) |
| PVP powder | 19.372 | 32.580 | 43.715 | 175.534 | — | — | — | — |
| CN-PPTA fiber | — | — | — | — | 128.659 | 136.946 | 166.987 | 110.790 |
| CN-PPTA/PVP blend powder[a] | 19.372 (0)[d] | 32.580 (0) | 43.715 (0) | 176.311 (0.777) | 128.659 (0) | 137.205 (0.259) | 166.987 (0) | n.d. |
| CN-PPTA/PVP blend powder[b] | n.d.[e] | n.d. | n.d. | 177.087 (1.553) | n.d. | 136.687 (−0.259) | 166.728 (−0.259) | 110.531 (−0.259) |
| CN-PPTA/PVP blend fiber[c] | 19.890 (0.518) | 33.097 (0.517) | 44.492 (0.777) | 177.346 (1.812) | 128.400 (−0.259) | 137.205 (0.259) | 166.728 (−0.259) | 111.049 (0.259) |

[a]Blend powder of CN-PPTA/PVP (50/50 wt %) obtained from isotropic solution (below 1 wt %).
[b]Blend powder of CN-PPTA/PVP (67/23 wt %) obtained from anisotropic solution.
[c]Blend fiber of CN-PPTA/PVP (67/23 wt %) obtained from anisotropic solution.
[d]Number in parenthesis indicates chemical shift difference (ppm).
[e]n.d. indicates chemical shift not determinable, due to overlapping with noise peak.

$^{13}$C resonance peaks of the blend fiber and blend fiber are completely separated from those of CN-PPTA fiber and PVP powder, with no overlapping. Chemical shifts for aromatics of the CN-PPTA component in the blend fiber and powder changed negligibly at 128.400 ppm with a difference of ±0.259 ppm, and at 137.205 ppm with a difference of ±0.259 ppm as did those for C=O of amide at 166.728 ppm with a difference of ±0.259 ppm. That is, CN-PPTA signals of the blend showed similar chemical shifts to pure CN-PPTA. This indicates that limited conformational freedom of rigid polymer chains. On the other hand, chemical shifts for aliphatics of the PVP component in the blend fiber changed down-field (shift to left) at 19.890 ppm with a difference of +0.518 ppm, at 33.097 ppm with a difference of +0.517 ppm, and at 44.492 ppm with a difference of +0.777 ppm while those for C=O of lactam changed considerably to down-field at 177.346 ppm with a difference of +1.812 ppm.

The down-field chemical shift of C=O of lactam was due to a lower electron density around the carbon atom of C=O of lactam via hydrogen bonding with NH of amide in the CN-PPTA component. The down-field chemical shifts of $CH_2$ of lactam were due to the induced-electron withdrawal effect. These results suggest that a homogeneous blend of CN-PPTA and PVP was produced on a molecular sale via hydrogen bonding.

The chemical shifts of C=O of the PVP blend considerably depend on the preparation method thereof. That is, changes of chemical shifts were 0.777, 1.553 and 1.812 ppm, for powder of blend obtained from an isotropic solution of CN-PPTA/PVP (50/50 wt %), for powder of blend prepared from an anisotropic solution of CN-PPTA/PVP (67/33 wt %), and for fiber of blend produced via LC spinning from an anisotropic solution of CN-PPTA/PVP (67/33 wt %), respectively. The larger change of chemical shifts for LC highly oriented blend fiber is due to stronger inter-chain hydrogen bonding between CN-PPTA and PVP than that between CN-PPTA itself arising from high orientation.

INDUSTRIAL APPLICABILITY

The present invention provides a molecular miscible blend solution of aromatic polyamide and a noncrystalline polymer, a method for preparing the same, an aromatic polyamide blend fiber using the same and a method for dyeing the fiber. According to the present invention, it is possible to prepare aromatic polyamide fibers which overcome limitations of high strength fibers which could not be developed as clothing materials since they could be prepared only by dope-dyeing. And the aromatic polyamide fibers according to the present invention exhibit thermal and mechanical properties comparable to conventional high strength fibers, and can be developed in a variety of colors, and may thus be utilized in a variety of applications including apparel and industrial applications.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A molecular miscible blend solution of aromatic polyamide and a non-crystalline polymer, in which the aromatic polyamide polymer and 5 to 100% of polyvinylpyrrolidone, based on the weight of the aromatic polyamide are dissolved in a polar organic solvent containing an inorganic salt,
wherein the aromatic polyamide polymer has at least 25 mol % of repeat units represented by the following Formula (I) to the whole repeat units of the aromatic polyamide polymer and the numbers of repeat units in each aromatic polyamide is 10 to 100,000:

wherein R is an aromatic group having at least one nitrile group substituted on the aromatic nucleus; and
R' is a phenyl, naphthyl or diphenyl group, each of which is substituted or not substituted by Cl, Br, I, $NO_2$, an alkyl group having 1 to 4 carbon atoms, or an alkoxy group having 1 to 4 carbon atoms.

2. The molecular miscible blend solution according to claim 1, wherein in Formula (I), R is selected from the group consisting of compounds represented by the following Formulae:

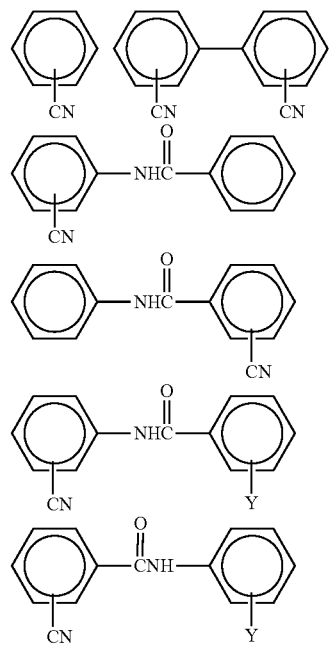

wherein Y represents Cl, Br, I, $NO_2$, an alkyl group having 1 to 4 carbon atoms, or an alkoxy group having 1 to 4 carbon atoms.

3. The molecular miscible blend solution according to claim 1, wherein the polar organic solvent is an amide-based organic solvent, a urea-based organic solvent or a mixture thereof.

4. The molecular miscible blend solution according to claim 3, wherein the polar organic solvent is selected from the group consisting of N-methyl-2-pyrrolidone (NMP), N,N-dimethyl acetamide (DMAc), hexamethylphosphoramide (HMPA), N,N,N',N'-tetramethyl urea (TMU), N,N-dimethyl formamide (DMF), dimethylsulfoxide (DMSO) and mixtures thereof.

5. The molecular miscible blend solution according to claim 1, wherein the inorganic salt is a halogenated alkali metal salt, a halogenated alkaline earth metal salt or a mixture thereof.

6. The molecular miscible blend solution according to claim 5, wherein the halogenated alkali metal salt or halogenated alkaline earth metal salt is $CaCl_2$, LiCl, NaCl, KCl, LiBr, or KBr.

7. The molecular miscible blend solution according to claim 1, wherein the inorganic salt is used in an amount of 12% or less, with respect to the weight of the polar organic solvent.

8. The molecular miscible blend solution according to claim 1, wherein the molecular miscible blend solution is optically anisotropic.

9. A method for preparing a molecular miscible blend solution of aromatic polyamide and a non-crystalline polymer, comprising:
   1) preparing a polymerization solvent including an amide-based organic solvent, a urea-based organic solvent or a mixture thereof;
   2) dissolving aromatic diamine in the polymerization solvent such that aromatic diamine having a nitrile group substituted in an aromatic nucleus is 25% to 100% by mole with respect to the total aromatic diamine;
   3) adding aromatic diacid halide to the polymerization solvent while strongly stirring at a temperature of 0 to 50° C.;
   4) allowing a gel-form polymer prepared in step (3) to stand for 0 to 24 hours; and
   5) adding an inorganic alkali compound to the gel-form polymer, followed by stirring, to prepare an aromatic polyamide solution; and
   6) adding polyvinylpyrrolidone to the aromatic polyamide solution, followed by dissolution and mixing, during stirring in step (5).

10. A method for preparing a molecular miscible blend solution of aromatic polyamide and a non-crystalline polymer, comprising:
   1) preparing a polymerization solvent including an amide-based organic solvent, a urea-based organic solvent or a mixture thereof;
   2) adding PVP to the polymerization solvent, followed by dissolution;
   3) dissolving aromatic diamine in the polymerization solvent containing PVP such that aromatic diamine having a nitrile group substituted in an aromatic nucleus is 25% to 100% by mole with respect to the total aromatic diamine;
   4) adding aromatic diacid halide to the polymerization solvent while strongly stirring at a temperature of 0 to 50° C.;
   5) allowing a gel-form polymer produced in step (4) to stand for 0 to 24 hours; and
   6) adding an inorganic alkali compound to the gel-form polymer, following by stirring.

11. The method according to claim 9, wherein the inorganic alkali compound is carbonate, hydride, hydroxide or oxide of an alkali metal or an alkaline earth metal, or a mixture thereof.

12. An aromatic polyamide blend fiber prepared by dry jet wet spinning the molecular miscible blend solution according to claim 1, wherein the aromatic polyamide blend fiber has a structure in which aromatic polyamide and polyvinylpyrrolidone are homogeneously mixed on a molecular scale.

13. A method for the aromatic polyamide blend fiber according to claim 12 at atmospheric pressure using an acid dye or basic dye.

14. The method according to claim 13, wherein the aromatic polyamide blend fiber to be dyed is dipped in a polar organic solvent or an aqueous solution containing a polar organic solvent, washed with water and dyed in a wet state.

15. The method according to claim 10, wherein the inorganic alkali compound is carbonate, hydride, hydroxide or oxide of an alkali metal or an alkaline earth metal, or a mixture thereof.

* * * * *

UNITED STATES PATENT AND TRADEMARK OFFICE
CERTIFICATE OF CORRECTION

| | | |
|---|---|---|
| PATENT NO. | : 8,604,121 B2 | Page 1 of 1 |
| APPLICATION NO. | : 13/264200 | |
| DATED | : December 10, 2013 | |
| INVENTOR(S) | : Tae-Jin Oh | |

It is certified that error appears in the above-identified patent and that said Letters Patent is hereby corrected as shown below:

Title Page, Item (54) and in the Specification, Column 1, Lines 1-6

Please replace with the following:

MOLECULAR MISCIBLE BLEND SOLUTION OF AROMATIC POLYAMIDE AND NON-CRYSTALLINE POLYMER, METHOD FOR PREPARING THE SAME, AROMATIC POLYAMIDE BLEND FIBER USING THE SAME AND METHOD FOR DYEING THE SAME

Signed and Sealed this
Fifteenth Day of April, 2014

Michelle K. Lee
*Deputy Director of the United States Patent and Trademark Office*